EXPANSION AND COMPRESSION OF ELECTRONIC PULSES BY OPTICAL CORRELATION

Filed Nov. 3, 1961

3 Sheets-Sheet 1

INVENTORS
LEO SLOBODIN
ABRAHAM REICH
By George Sullivan
Agent

INVENTORS
LEO SLOBODIN
ABRAHAM REICH
By George Sullivan
Agent

INVENTORS
LEO SLOBODIN
ABRAHAM REICH
By [signature]
Agent 3,189,746

EXPANSION AND COMPRESSION OF ELECTRONIC PULSES BY OPTICAL CORRELATION

Leo Slobodin, Keyport, and Abraham Reich, South Plainfield, N.J., assignors to Lockheed Aircraft Corporation, Burbank, Calif.

Filed Nov. 3, 1961, Ser. No. 150,071
6 Claims. (Cl. 250—216)

This invention relates generally to expansion and compression of electronic pulses and more particularly to a method and apparatus for width modulating electronic pulses of ultrasonic carrier frequency energy by means of optical correlation.

In carrying out the teachings of the invention, a collimated light beam is generated to illuminate an ultrasonic light modulator. An electronic pulse signal of carrier energy is applied to the modulator setting up a compressional disturbance which diffracts the light and produces a moving waveform image of the applied pulse. The moving waveform image is projected onto a stationary correlator mask containing a diffraction grating matching the waveform image. As the image moves across the correlator mask, waveform coincidence is detected by photosensitive means to generate a width modulated replica of the applied pulse.

The terms "width modulated" and "width modulating" as used herein means either or both compression and expansion of the input pulse waveform.

In the case of pulse compression the electronic pulse signal applied to the light modulator is a wide pulse relative to the modulator light aperture. The disturbance in the ultrasonic light modulator due to this wide pulse, when scanned across the correlator mask, will superimpose completely during a brief instant of time. The input to the photosensitive device will rise sharply in light intensity at this instant. The output of the photosensitive device will then be a narrow pulse in time.

In the case of pulse time expansion, the electronic pulse signal applied to the ultrasonic light modulator is a narrow pulse relative to the modulator light aperture. The disturbance in the ultrasonic light modulator due to this narrow pulse, when scanned across the correlator mask, will result in a light input to a photosensitive device extending over a far greater duration of time than the pulse applied to the ultrasonic light modulator. The output of the photosensitive device will then be a wide pulse in time.

In certain radar applications, it is desirable to obtain very high range resolution without sacrifice of range capability. To those skilled in the art, it is well known that radar systems have been designed that radiate long, frequency modulated pulses and by electronic means compress the pulses to a fraction of their transmitted length. Range resolution is thereby improved and range capability increased. The present invention not only provides a new and improved means for obtaining compression ratios currently available by electronic techniques for such types of radar, but is capable of compression ratios many times greater. Compression ratios in the order of one hundred (100) are readily obtainable through use of the teachings of this invention.

A principal object of this invention is, therefore, to provide a method and apparatus for width modulating electronic pulses by optical correlation.

Another object of this invention is to provide a method and apparatus for width modulating electronic pulses which is exceedingly simple as compared with all-electronic systems of the prior art. The optical system of the present invention is capable of processing in real time (substantially instantaneously) a wide variety of electronic waveform shapes while an all-electronic system can only process a particular single pulse waveform shape.

A further object of this invention is to provide a method and apparatus for frequency coding electronic pulses by any of a great number of codes.

Still another object of this invention is to provide a method and apparatus for performing mathematical computations as for example the Fourier and Laplace transforms, as well as various auto-correlation and cross-correlation functions. This permits the optical solution of wide classes of problems encountered in radar and communications technology.

Further objects and advantages will become apparent from the following detailed description, especially when considered in combination with the accompanying drawing wherein like numerals refer to like parts.

Figure 1:
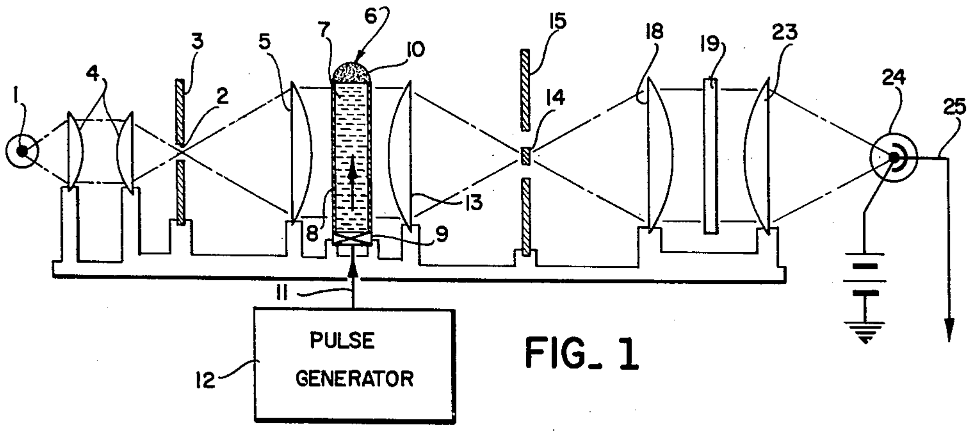
FIGURE 1 illustrates a representative embodiment of the invention apparatus.

In the apparatus of FIGURE 1, a source of monochromatic light 1 such as that derived from a mercury arc lamp is focused upon a slit 2 in diaphragm 3 by a condensing lens system 4. The light emerging from slit 2 is collimated by lens 5 to illuminate an ultrasonic light modulator 6.

The ultrasonic light modulator 6 includes a transparent column of material 7, a solid such as quartz or a fluid such as water, covering substantially the entire optical aperture. The column of fluid is enclosed within a tank or storage cell 8, the sides of which normal to the light beam are transparent or light transmissive. At one end of the column is a piezo-electric transducer 9 and at the other end is an energy absorber 10 such as rubber or the like. The transducer may be suitably damped in its mounting to obtain the required band-width.

The ultrasonic light modulator per se, as well as its operation, has been previously developed and usefully applied in optics such as described in volume 27 of the Proceedings of Institute of Radio Engineers, page 483 et seq. While the column of transparent material in the light modulator may be a solid such as quartz, it is generally a fluid and will be so identified in this description, for purposes of clarity and convenience. It should be understood, however, as being within the teachings of this invention to substitute, for the fluid, a solid such as quartz.

When transducer 9, forming a part of the ultrasonic light modulator 6, is excited by an electronic pulse signal through lead 11, it sets up compressional waves in the fluid. These compressional waves travel through the fluid and cause local periodic changes in the index of refraction of the fluid. When collimated light passes through the disturbed fluid, diffraction of the light results.

The electronic pulse signals applied through lead 11 are pulses of ultrasonic carrier frequency energy and may be derived from any suitable source, as illustrated in the drawing by pulse generator 12.

Figure 2:
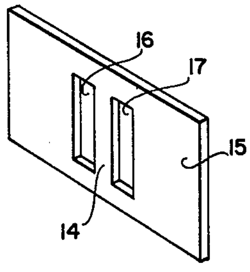
FIGURE 2 is a perspective view of the diffracted light filter for the apparatus shown in FIGURE 1.
Figure 3:
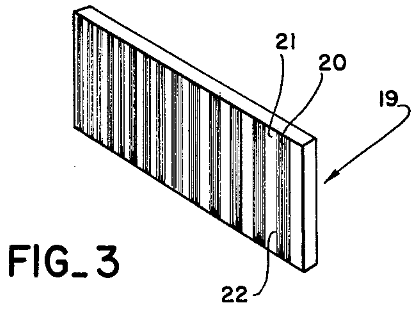
FIGURE 3 is a perspective view of the correlator mask in the FIGURE 1 apparatus.

When the fluid in the ultrasonic light modulator is undisturbed, the light emerging from the modulator is focused by lens 13 upon a stop bar 14 of diaphragm 15. In FIGURE 2 there is shown a perspective view of the diaphragm. This is only one of a number of possible arrangements. The bar 14 is located in the center of the diaphragm 15 with clear apertures 16 and 17 at either side of the stop bar. Stop bar 14 thus prevents the undisturbed collimated light from passing through diaphragm 15. When the light is diffracted by an acoustic disturbance in modulator 6, the image at stop bar 14 is dispersed and light passes through apertures 16 and 17. This light is collimated by lens 18 of FIGURE 1 and superimposed upon correlator mask 19.

Correlator mask 19 is a density modulated light transmissive diffraction grating, as wide as the optical aperture, containing spaced strips 20 of substantially opaque material between which are light transmissive slits or spaces 21. The correlator may physically consist of a transparent base material such as glass or acetate or polyester film with the opaque strips being painted on or preferably photographically produced with a photosenstive emulsion. The width and spacing of the opaque strips are varied to provide system band width. Obviously, there are a number of ways of making the correlator mask, the only requirement being to present to the light beam a diffraction grating of alternately opaque and light transmissive strips. The degree of non-uniformity of strip width and spacing is determined by the band width requirements, and the variation may be linear, sinusoidal, or even noise like, or any of an almost infinite number of types, so long as the band width capabilities of the system are not exceeded.

The strips of correlator mask 19 are the counterpart of the signal waveform propagating through the ultrasonic light modulator 6. The wave length Λ, or equivalently the distance between the leading edge 22 of adjacent opaque strips on the correlator, may be mathematically expressed as:

$$\Lambda=\frac{v}{f}$$

where $v$ is the velocity of propagation in the fluid of the modulator and $f$ is the signal frequency. Hence, if the band width is $\Delta f$ to pass the required signal information, then the variation in wave length is $\Delta\Lambda$. An opaque strip and one adjacent light transmissive strip are equivalent to and represent a given wave length Λ. By selecting the proper width and spacing of the pairs of strips making up the diffraction grating of the correlator, a reproduction of the signal waveform appearing in the ultrasonic light modulator is obtained to selectively produce either expansion or compression of the pulse waveforms applied to the modulator.

The light emerging from correlator mask 19 is focused by lens 23 onto a photosensitive device such as a photoelectric tube 24 to produce an electronic signal output at lead 25 which is a width modulated replica of the applied pulse of carrier energy.

Figure 4:
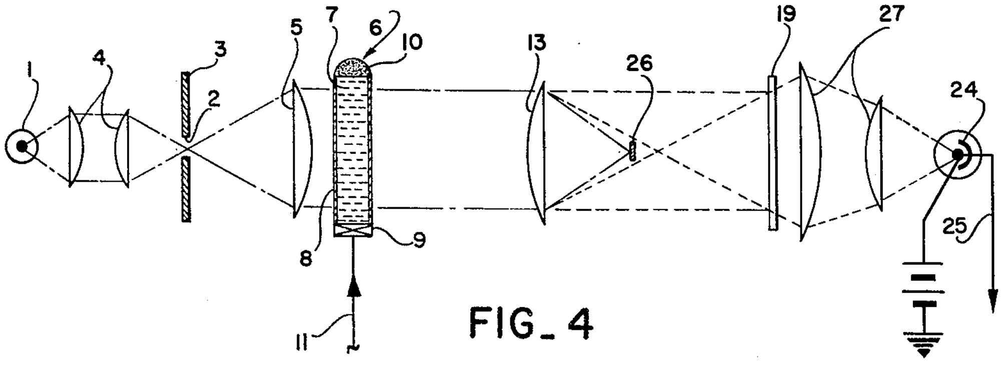
FIGURE 4 illustrates a modification of the FIGURE 1 apparatus.

Referring specifically to the modified apparatus of FIGURE 4 there is shown, as in FIGURE 1, a source of light 1 which is focused upon a slit 2 in diaphragm 3 by condensing lens system 4. The light emerging from slit 2 is collimated by lens 5 to impinge on ultrasonic light modulator 6. Lens 13, unlike the arrangement of FIGURE 1, is located a distance greater than its focal length from the ultrasonic light modulator and focuses all the collimated light on a stop bar 26 when the solid or fluid in the modulator is undisturbed. Because of its location with respect to the light modulator, lens 13 in FIGURE 4 creates a real image of the modulator wave train. The plane of this image is located beyond the stop bar, and the correlator mask 19 is positioned at the image plane. When the fluid in the modulator is undisturbed, the image of the modulator is totally dark, since all of the light is stopped by bar 26. However, when a signal is applied to the modulator through lead 11, pressure waves are set up in the fluid, causing light to be dispersed about the stop bar. This light contains the image of the compressional waves in the fluid. The image scans the correlator mask 19 as the waves progress through the fluid. The opaque strips of the correlator diffraction grating produce fluctuations in the intensity of the light emerging therefrom and these fluctuations are detected by the photoelectric tube 24 through condensing lens system 27.

The basic principle of the operation of the apparatus of FIGURES 1 and 4 is the same. Therefore, in describing the operation of the apparatus, only FIGURE 1 will be referred to for convenience.

Operation of the apparatus for the case of pulse expansion will be considered first. A pulse of carrier energy, narrow with respect to the optical aperture, is applied to the transducer 9 of modulator 6. The spectral energy is centered in the band-pass of the transducer. The transducer vibrates for the duration of the pulse and causes a small group of compressional waves to propagate through the column of fluid in the modulator. The disturbance in the fluid produced by these compressional waves causes light to pass through the diaphragm 15. This light is collimated by lens 18 and impinges upon correlator mask 19. The light imaged thereon is a narrow beam equal in width to the group of compressional waves in the ultrasonic light modulator. The width of the group of compressional waves is normally very small as compared with the full optical aperture of the apparatus, in the case of pulse expansion.

As the compressional waves propagate through the fluid, the light beam thus produced is caused to scan correlator mask 19. As the light beam scans the correlator, the alternate opaque and transparent strips produce fluctuations in the intensity of the light emerging from the correlator. The fluctuations vary in accordance with the strip width and spacing and they are detected by photoelectric tube 24. The output signal of the photoelectric tube is electronic energy at a frequency equal to the fluctuation rate of the light intensity. If the variation of strip width and spacing matches the band-width of the energy in the narrow input pulse, then the photoelectric tube 24 output will contain signal information for a period of time equal to that required for the light beam to scan the correlator. Thus, the short duration input pulse is expanded to a long duration, frequency modulated pulse by the ratio of the width of the compressional wave train in the ultrasonic modulator to the width of the full optical aperture. It is of course possible to achieve larger expansion ratios by using a larger optical aperture, or using a fluid with slower acoustic propagation velocity, or using a narrower input pulse. Decreasing the input pulse width requires an increase in system band-width and also a greater variation in the strip width spacing of correlator mask 19.

Operation of the same apparatus to produce pulse compression will now be described. In this case, a wide pulse, nearly as wide as the optical aperture, is applied to transducer 9 of the light modulator. This pulse must possess certain qualifications to allow the compression process to take place. The pulse must contain the same frequency modulation characteristic as that of the correlator mask 19 used, and hence it is essentially equivalent to the expanded output pulse previously described. In addition, the frequency structure characteristic of the pulse must undergo time inversion. This means that if, for example, the pulse contained a frequency modulation or, equivalently, a frequency delay characteristic such that the lower frequencies occurred near the leading edge of the pulse and the higher frequencies occurred near the trailing edge, the frequency positions (or delay) would have to be reversed so that the higher frequencies were positioned at the leading edge and the lower frequencies were positioned at the trailing edge. This simply means that frequency delay equalization is necessary for pulse compression. That is, the frequencies which were time-delayed most during the expansion phase must be time-delayed the least for the compression phase; and likewise, those frequencies delayed the least during expansion must now be delayed the most for compression. In this manner, all frequencies are made to occur simultaneously in the compressed pulse. Methods for producing this delay inversion are not the direct concern of this invention. Suffice it to say that it may be accomplished either optically, by propagating the pulse energy during compression through the ultrasonic light modulator in a direction opposite to that used for pulse expansion, or electronically, by frequency conversion and selection of appropriate side band.

When transducer 9 of modulator 6 is excited by this wide pulse it sets up compressional waves in the fluid. As the compressional waves enter the optical aperture, scanning of correlator mask 19 begins. In this case, the expanded pulse length is substantially equivalent to the full optical aperture, so that as the waves progress in the fluid an increasingly wider light beam impinges upon correlator mask 19. An instant is reached when the expanded pulse occupies the substantially entire aperture and correlator mask 19 is fully exposed to the light. Thereafter, the light beam becomes increasingly narrow as the pulse leaves the fluid and the energy is dissipated by absorber 10. The light beam at the plane of the correlator mask 19 contains an image of the waves in the ultrasonic light modulator 6. Since, as stipulated earlier, the pressure wave spatial distribution is identical to that of the diffraction grating of correlator mask 19, it is seen that the moving waves are being compared or matched against a stationary image of themselves, namely the diffraction grating of the correlator mask. This action is mathematically represented by the correlation function:

$$\phi_{fg}(\tau)=\lim_{T\to\infty}\frac{1}{2T}\int_{-T}^{T}f(t)g(t+\tau)\,dt$$

where $\phi_{fg}(\tau)$ is the cross-correlation function of two signals $f(t)$ and $g(t)$. Since, in this case the signals are identical, $f(t)\cong g(t)$, the cross-correlation function reduces to the autocorrelation function.

$\tau$ is the time shift of one signal with respect to the other. In this system it is the scanning of correlator mask 19 as performed by the wave progression in ultrasonic light modulator 6.

T is the signal length. The time during which a comparison is made between the signal and the correlator mask diffraction grating is 2T.

As the waveform image traverses correlator mask 19, it produces fluctuations in the intensity of the light emerging from the correlator. These fluctuations are very small or imperceptible except during a very small period of time when the wave image is near or in exact juxtaposition with its correlator counterpart. Within that small time interval, the fluctuations increase rapidly and become very large, causing the photoelectric tube 24 output to peak sharply. Hence, during an entire scan period, a narrow pulse of carrier energy is produced. The shape of this pulse is actually a plot of the correlation function.

The shape of the correlation function is determined by the type of frequency modulation used; that is, whether it is linear, sinusoidal, noise-like, etc. Regardless of which type is used, the width of the function is much smaller than the width of the expanded pulse. If the frequency modulation is noise-like or random, the correlation function will appear as in impulse whose width is dictated by the band-width of the system. Since the narrow pulse which is used to generate the expansion-compression cycle is as narrow as the band width permits, the correlation function output will very much resemble this pulse. In this manner, the compression of the wide pulse to the original narrow pulse is accomplished.

In performing the pulse compression the optical device has, in essence, computed the autocorrelation function. However, the computation capability of the device is not necessarily limited to that function alone. In fact, most linear operations of an integral transform nature can be implemented with this system. Thus, in addition to the autocorrelation and cross-correlation functions, convolution, Fourier transform and Laplace transform implementations can be obtained. This permits the optical solution of wide classes of problems encountered in radar and communications technology. Some areas which can be mentioned in this connection are: spectral analysis, antenna-pattern analysis, modulation theory, filter theory, function multiplications, differentiation and integration, and data reduction.

It is possible to create a wide variety of frequency modulations by changing the strip width and spacing variation of the correlator mask. If these strip width and spacings are made random within the system band width constraints, the possible number of unique detectable modulations becomes enormous. As discussed earlier, only that expanded pulse having the proper frequency modulation can be correlated and compressed through the optical system. The frequency modulation of the pulse energy may be regarded as a code whereby it is possible to separate the desired signal from clutter and noise. Or, conversely, the optical system containing a given correlator mask 19 (decoder) rejects all signals not properly frequency coded. Hence, it is immediately obvious that this invention can provide a new and improved anti-jamming capability for radar as well as a secure coding capability for IFF (Identification Friend or Foe) systems. Codes may be changed merely by replacing, in the optical system, a correlator mask 19 having a given modulation or code with another correlator mask 19 containing an entirely different modulation or code as easily as replacing lantern slides. This of course may be accomplished either manually or automatically, as desired.

Figure 5:
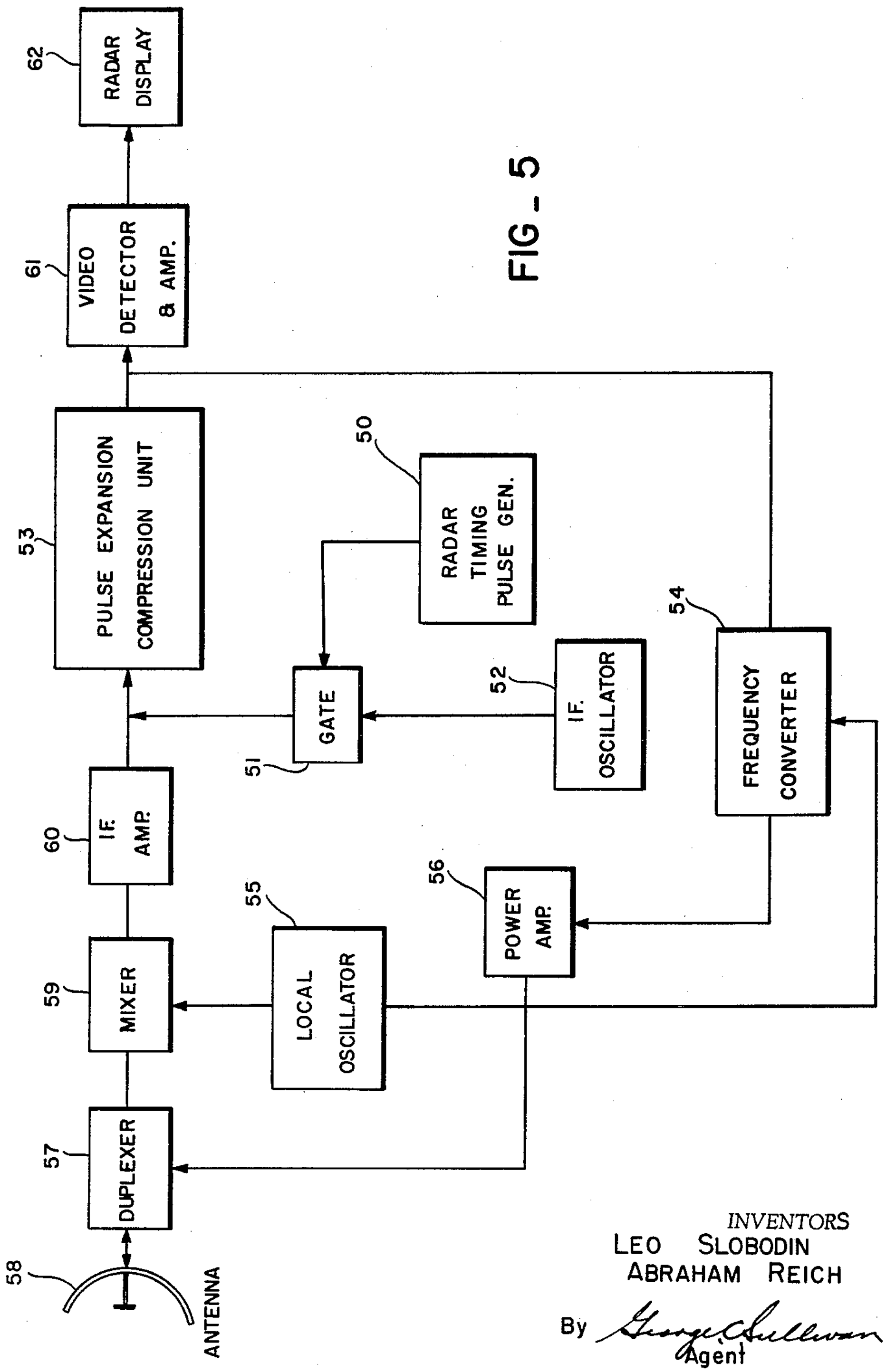
FIGURE 5 illustrates, in block diagram form, a typical radar system incorporating apparatus of the present invention.

In FIGURE 5 there is illustrated, in block diagram form, a typical application of the invention apparatus in a radar system. A pulse generator 50 generates timing pulses to establish the repetition rate of the radar. These pulses enable the gate 51 to pass through short bursts of the energy produced by the intermediate frequency (IF) oscillator 52. The bursts of IF frequency constitute narrow pulses of IF carrier energy. The narrow IF pulses are expanded in time by the pulse expansion-compression unit 53, which unit may take the form of the apparatus shown in FIGURE 1. The expanded output pulses are applied to frequency converter 54 which converts the expanded pulse intermediate frequency to the radar transmit frequency (RF) by heterodyning the IF with the local oscillator 55 frequency. The wide RF pulses are suitably amplified in amplifier 56 and then applied to duplexer 57. The duplexer 57 passes the high-power energy to the antenna 58 while minimizing the leakage of energy between the transmitter and receiver sections.

The received energy from antenna 58 is passed through duplexer 57 to mixer 59 wherein the received energy is converted to IF frequency by heterodyning with the local oscillator 55 frequency. The received expanded pulses are amplified in amplifier 60 and applied to the pulse compression unit 53. Compression of the expanded pulses takes place and output is applied to a video detector-amplifier 61. The video detector-amplifier 61 output video pulses are applied to the radar display unit 62 having a cathode ray tube, or the like, for the presentation of radar signal information.

Figure 6:
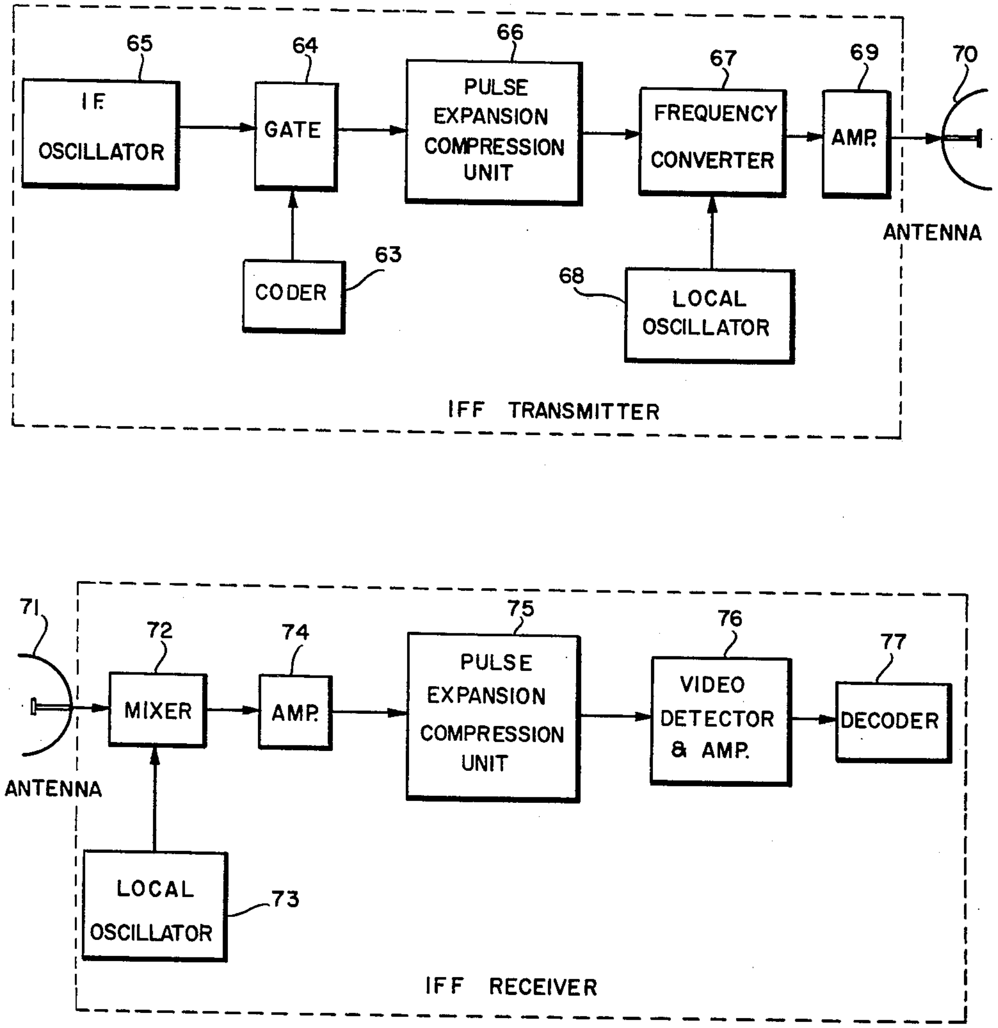
FIGURE 6 illustrates an application of the invention apparatus in a coded communication system.

FIGURE 6 illustrates, in block diagram form, an application of the invention apparatus in a communication system such as for IFF. In the IFF transmitter, a coder 63 generates a series of pulses positioned in time according to a predetermined code. These pulses enable the gate 64 to pass through short bursts of the energy produced by the intermediate frequency (IF) oscillator 65. The bursts of IF constitute narrow pulses of IF carrier energy. The narrow IF pulses are expanded in time by the pulse expansion-compression unit 66, which unit may take the form of the apparatus shown in FIGURE 1. The expanded output pulses are applied to frequency converter 67, which converts the expanded pulse intermediate frequency (IF) to the transmit frequency (RF) by heterodyning the IF with the local oscillator 68 frequency. The wide RF pulses are amplified to the proper transmitting power level by amplifier 69 and radiated by antenna 70.

In the IFF receiver, the received energy from antenna 71 passes through mixer 72 wherein the received energy is converted to IF by heterodyning with the local oscillator 73 frequency. The received expanded pulses are amplified in amplifier 74 and applied to the pulse compression unit 75, which unit, like unit 66, may be like the FIGURE 1 apparatus. Compression of the expanded pulses takes place and the output is applied to a video detector-amplifier 76. The output pulses of the video detector-amplifier are applied to the decoder 77 which presents the information contained in the code.

Outfitting a network of transmitters and receivers at different locations with the optical correlation device of this invention, it is possible with the use of duplicates of the same correlator mask 19 to maintain a secure communication system very suitable for IFF requirements. Communication codes may be readily changed at scheduled intervals by replacement of the correlator masks.

While only two specific embodiments of applicants' invention have been shown and described, it is to be understood that many alterations, modifications and substitutions may be made thereto to meet the requirements of the various applications such as those mentioned herein without departing from the spirit and scope of the invention as defined by the appended claims.

We claim:

1. A device for width modulating electronic pulses of carrier energy comprising, a light transmissive medium adapted to transmit mechanical compressional waves and exhibit light diffractive properties dependent upon the intensities of compressional disturbances therein, a piezoelectric transducer responsive to applied electronic pulses of carrier energy and arranged on one side of said medium for exciting said medium with mechanical compressional waves, an energy absorber on the opposite side of said medium for damping said waves, a source of light, lens means collimating and directing light from said source through said medium transverse to the direction of propagation of waves therein, a light stop constructed and arranged to intercept at least a portion of the light emerging from said medium, the magnitude of the portion so intercepted varying in accordance with the degree of diffraction of said light in response to the compressional waves set up in the medium by said transducer, second lens means focusing diffracted light passing said stop to form an image of the compressional waves in said medium, a light transmissive correlator mask in the image plane of said second lens means having a diffraction grating of spaced substantially opaque lines presenting a replicated stationary wave form of said image in the full optical aperture of the lens means, photoelectric means, and third lens means focusing light emerging from the correlator mask onto said photoelectric means to provide a width modulated replica of the applied pulse of carrier energy.

2. A device for width modulating electronic pulses comprising, a light source providing a beam of collimated light, light modulating means responsive to applied electronic pulses for producing in the light beam a moving waveform image of the applied electronic pulse waveform, a light transmission correlator having a diffraction grating of opaque lines and slits representing a stationary reproduction of the moving waveform appearing in said light beam, lens means focusing the moving waveform onto said correlator, and photoelectric means responsive to the light passing said correlator to detect superposition of the stationary and moving waveforms and provide a width modulated replica of the applied electronic pulses.

3. In a communications system for transmitting and receiving electronic pulses of carrier energy, optical means producing a moving waveform image of an applied electronic pulse waveform, a correlator mask arranged to intercept the moving waveform image and having a series of light transmissive slits separated by substantially opaque strips of a width and spacing representing a stationary reproduction of the intercepted waveform image, and photosensitive means detecting the waveform image through the slits in said correlator mask to provide an electrical current output containing a width modulated replica of the applied electronic pulse.

4. A device as defined in claim 3 including a second optical means producing a moving waveform image of the output pulse from the photosensitive means, a second correlator mask arranged to intercept the output pulse moving waveform image and having light transmissive slits and substantially opaque strips representing a stationary reproduction of the intercepted output pulse moving waveform image, and photosensitive means detecting the waveform image through the slits in said second correlator mask to provide an electrical current output containing a reconstruction of the initial electronic pulse waveform.

5. In a device of the type described, a correlator mask comprising a series of spaced parallel substantially opaque strips forming a series of light transmissive slits therebetween and across substantially the entire optical aperture, the width of each said strip being substantially equal to the width of one adjacent slit and each succeeding strip width differing from the width of the preceding strip, the total strip width variation determining the system band width and the distance between the leading edge of adjacent strips being equal to one wavelength whereby a moving electronic pulse carrier energy waveform image may be superimposed on the resultant diffraction grating and detected photosensitively.

6. In apparatus of the character described, a light transmissive ultrasonic light modulator cell filled with a light transmissive liquid and connected to receive an applied pulse of carrier energy whereby a rarefaction and compression waveform corresponding thereto is propagated through the liquid, a collimated light beam projecting through substantially the entire quantity of liquid transversely of the direction of wave propagation, lens means forming an image of the light beam emerging from said liquid, stop means passing only the emerging light diffracted by the waveform in said liquid, a light transmissive diffraction grating of opaque lines and slits representing a stationary reproduction of the waveform in said liquid and arranged in the image plane of said lens means to receive the diffracted light, and photosensitive means responsive to the light transmitted through said diffraction grating and having an electrical current output containing a width modulated replica of the applied pulse.

References Cited by the Examiner

UNITED STATES PATENTS

| | | | |
|---|---|---|---|
| 2,016,036 | 10/35 | FitzGerald | 250—237 X |
| 2,084,201 | 6/37 | Karolus | 88—61 |
| 2,158,990 | 5/39 | Okolicsanyi | 88—61 |
| 2,234,329 | 3/41 | Wolff | 88—61 |
| 2,385,085 | 9/45 | Labin | 250—225 X |
| 2,406,299 | 8/46 | Koulicovitch | 250—237 |
| 2,418,964 | 4/47 | Arenberg | 250—225 X |
| 2,540,827 | 2/51 | Mankin | 250—216 X |
| 2,813,146 | 11/57 | Glenn | 88—61 |
| 2,857,802 | 10/58 | Cail | 250—237 |
| 2,943,315 | 6/60 | Rosenthal | 88—61 |
| 3,088,113 | 4/63 | Rosenthal | 88—61 |

RALPH G. NILSON, *Primary Examiner.*

Notice of Adverse Decision in Interference

In Interference No. 95,507 involving Patent No. 3,189,746, L. Slobodin and A. Reich, EXPANSION AND COMPRESSION OF ELECTRONIC PULSES BY OPTICAL CORRELATION, final judgment adverse to the patentees was rendered Oct. 24, 1968, as to claim 5.

[*Official Gazette June 3, 1969.*]